TUNABLE CONSTANT BAND-WIDTH SIGNAL-TRANSLATING STAGE

Filed June 22, 1946

INVENTOR,
HAROLD A. WHEELER,
BY Harry C. Page
ATTORNEY.

Patented Sept. 2, 1952

2,609,460

UNITED STATES PATENT OFFICE 2,609,460

TUNABLE CONSTANT BAND-WIDTH SIGNAL-TRANSLATING STAGE

Harold A. Wheeler, Great Neck, N. Y., assignor to Hazeltine Research, Inc., Chicago, Ill., a corporation of Illinois Application June 22, 1946, Serial No. 678,709

5 Claims. (Cl. 179—171)

Figures 1, 2, 3:
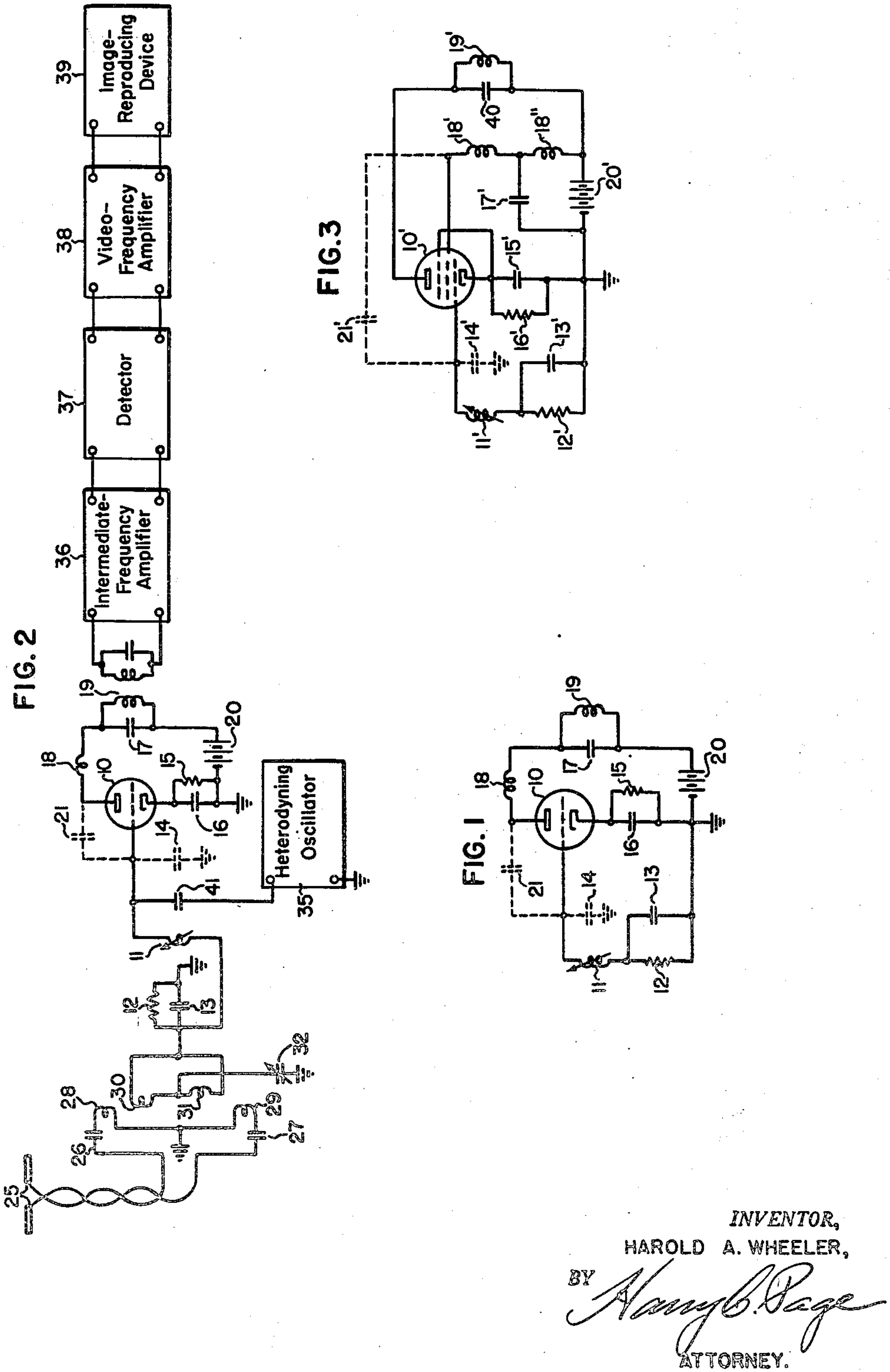

This invention is directed to signal-translating stages intended to exhibit constant band-width damping at all frequencies within their operating ranges. The expression "constant band-width damping" is here used to denote a finite value of damping which is substantially constant so that the stage has a uniform band width at all frequencies within its operating range.

The invention is particularly related to signal-translating stages which comprise a vacuum tube having an inductively tunable selector connected directly to its input electrodes and operated over a wide range of high frequencies in which transit-time and other inherent loading effects tend materially to influence the circuit behavior. Such effects are pronounced for wave signals having periods somewhat greater than the electron transit time in the tube.

Constant band-width stages of the tpye under consideration are of general utility and may, for example, be advantageously employed in a television wave-signal receiver, tunable to receive signals from any selected one of a plurality of transmitting stations. In that application, a constant band-width characteristic is especially desirable, since the modulation bands of the several transmitting stations are nominally of equal width.

Prior signal-translating stages, including a vacuum tube and an input circuit comprising an inductively tunable selector as indicated above, have not been arranged to maintain constant band width by virtue of a uniform finite value of input conductance to the tube. In such prior arrangements the damping has usually been variable because the input conductance to the tube in the usual case increases in proportion to the square of the frequency. It may be demonstrated that this change in input conductance and band-width damping is attributable to cathode-lead inductance and transit-time loading effects within the tube which also vary as the square of the frequency.

In United States Letters Patent 2,279,543, issued on April 14, 1942, and assigned by mesne assignments to the same assignee as the present invention, applicant has taught how the transit-time loading in the input circuit of a vacuum tube may be completely neutralized to eliminate its variable loading effect on the input circuit of the stage including that tube. The present invention stems from applicant's earlier work and proposes an arrangement wherein the loading is utilized when it has the correct value and is otherwise compensated in a manner to provide a constant finite value of input conductance for the tube and thereby a constant band-width damping of the input selector at all frequencies in the operating range.

It is an object of the present invention, therefore, to provide a signal-translating stage for operation over a wide range of frequencies and which avoids the afore-mentioned limitation of prior arrangements.

It is another object of the invention to provide an improved signal-translating stage characterized by substantially constant band-width damping for any frequency within a wide range of high frequencies.

It is a specific object of the invention to provide a high frequency signal-translating stage having a uniform band-width characteristic over a wide operating range and having an improved signal-to-noise ratio.

In accordance with the present invention a signal-translating stage for operation over a wide range of high frequencies comprises a vacuum tube having an anode, a cathode and a control electrode. A frequency selective input circuit is connected with the cathode and control electrodes of the tube and is primarily inductively tunable over the operating range. An output circuit for the stage including a reactance means of a first type and reactance means of a second type is serially coupled to the anode and cathode of the tube. The stage has incidental reactive characteristic with respect to the input circuit tending to develop thereacross a first component of positive conductance which varies with frequency over the operating range, and a feed-back circuit is included in the stage for compensating the variable conductance referred to. The feed-back circuit is provided from the aforementioned output to the aforementioned input circuits including the reactance means of a first type and additional reactance means of the same type so proportioned as to introduce into the input circuit a second component of positive conductance having a constant value over the range. It also includes the reactance means of the second type coupled to a portion of the additional reactance means and being so proportioned as to introduce into the input circuit a component of negative conductance which is substantially equal to and varies with frequency in the same manner as the first-mentioned component of positive conductance. The proportioning of the first-mentioned reactance means is substantially determined by the product of the transconductance of the tube and at least a portion of the interelectrode capacitance between a predetermined pair of electrodes thereof divided by the amount of the second component which it is desired to utilize. The proportioning of the reactance means of the second type is substantially determined by the value of the component of negative conductance divided by the product of the transconductance, the aforementioned portion of the interelectrode capacitance and a power of the mean frequency of the signal being translated through the tube. Therefore, the input circuit experiences a substantially constant finite net value of positive conductance at all frequencies within the range.

For a better understanding of the present invention, together with other and further objects thereof, reference is had to the following description taken in connection with the accompanying drawing, and its scope will be pointed out in the appended claims.

In the drawing, Fig. 1 is a schematic circuit diagram of a signal-translating stage including the present invention in one form; Fig. 2 represents a television wave-signal receiver having incorporated therein a signal-translating stage of the type shown in Fig. 1; and Fig. 3 is a schematic circuit diagram representing the invention in modified form.

Referring now more particularly to Fig. 1, the arrangement there represented is a constant band-width signal-translating stage, such as a modulator, for operation over a wide range of high frequencies. The stage comprises a vacuum tube 10 of the triode type having an anode, a cathode and a control electrode. A frequency-selective input circuit is directly connected with the cathode and control electrodes of the tube and, as illustrated, is provided by a variable inductor 11 and a grid resistor 12, by-passed for high-frequency currents by a condenser 13. A condenser 14 is associated with inductor 11 to constitute a well-known form of selector which is primarily inductively tunable over the contemplated operating range. Condenser 14 is shown in broken-line construction for the reason that it may be comprised in whole or in part of the inherent capacitance of the circuit of the control electrode of tube 10. A self-biasing resistor 15, by-passed for high-frequency currents by a condenser 16, is coupled in conventional manner to the cathode of the tube. The stage also has an output circuit including a reactance means of a first type and a reactance means of a second type serially connected to the anode and cathode of tube 10. More specifically, this output circuit includes a capacitive reactance means or condenser 17 and an inductive reactance means or inductor 18. Condenser 17 is associated with an additional inductor 19 so that the elements 17, 19 provide an output selector for the stage which may be tuned to an intermediate frequency when the modulator is utilized to convert a received radio-frequency signal to a lower intermediate frequency. At the received and heterodyne signal frequencies, inductor 19 functions as a radio-frequency choke and, if desired, it may be variable to facilitate tuning of the output selector. The anode-cathode circuit also includes the usual space current source or battery 20. An additional capacitive reactance means, shown as a condenser 21, which is small in comparison with condenser 17, provides a feed-back circuit from the output to the input circuits of the stage. This feed-back circuit includes the elements 17 and 18 and is provided for a purpose to be described presently. Condenser 21 is shown in broken-line construction because it may be comprised mainly of the interelectrode capacitance between the anode and control electrodes of tube 10.

Inductors may be coupled with the selector of the input circuit in well-known manner to supply a radio-frequency signal as well as the signal output of a heterodyning oscillator to the modulating stage of Fig. 1 for modulation. However, in an effort to simplify the drawing, such arrangements which are well known in the art have not been illustrated. In like manner, an inductor may be coupled with the output selector 17, 19 to derive an intermediate-frequency signal from the stage. So far as the operation of the modulator is concerned, it will be apparent that a received radio-frequency signal may be heterodyned with the signal output of a local oscillator to produce in the output circuit of the stage an intermediate frequency signal for application and utilization by succeeding stages. In this respect, the arrangement is conventional.

The novelty and value of the present invention as applied to the modulator stage of Fig. 1 is readily apparent from a consideration of the input conductance characteristic of the stage and its effect upon the band width. It is contemplated that the stage is to operate over a range of high frequencies wherein it is subject to transit-time, cathode-lead inductance, and similar inherent loading effects. As pointed out in the earlier portions of this specification, such loading effects contribute a component of positive conductance to the input of tube 10. This component, hereinafter identified as "the first component of positive conductance," varies with the square of the operating frequency and may be represented as follows:

$$G_t = F\omega^2 \tag{1}$$

where $F$=a function of the electron transit time, and
$\omega$=mean angular frequency of the signal translated by the stage.

Expression (1) may be considered as representing the total input conductance due to reaction to the input circuit of the high-frequency stage and while other components are to be included for a rigorous and complete discussion of conductance, the one selected is predominant and may be considered alone for the purposes of the present discussion. As already pointed out, this first component of positive conductance varies with frequency and necessarily has a tendency to provoke like variations in band width inasmuch as the input conductance to tube 10 may be likened to a damping shunt conductance for the input selector 11, 14. This undesirable variation of band width is compensated, in accordance with the present invention, by the feed-back circuit which has the following influence on input conductance.

A second component $G_C$ of positive conductance is introduced into the input circuit due to the capacitive reactance means of the feed-back circuit. In particular, this component of positive conductance results from a voltage developed across condenser 17 and fed back through condenser 21. The magnitude of this second component of positive conductance may be expressed as:

$$G_C = g_m \frac{C_{21}}{C_{17}} \tag{2}$$

where $g_m$=transconductance of tube 10
$C_{17}$=value of condenser 17, and
$C_{21}$=interelectrode capacitance between the anode and control electrode of tube 10.

The positive-conductance component $G_C$ has a constant value over the operating range, independent of frequency and adjustable in accordance with the selection of condenser 17.

The inductive reactance of the feed-back circuit in cooperation with the portion of its capacitive reactance represented by condenser 21 introduces into the input circuit a component $G_L$ of negative conductance due to the voltage developed across inductor 18 and fed back by way of condenser 21. This component varies in accordance with the expression:

$$G_L = g_m \omega^2 C_{21} L_{18} \quad (3)$$

where $L_{18}$=value of inductor 18 and the other symbols have the significance recited in connection with expressions (1) and (2). Equation 3 shows the negative-conductance component $G_L$ to vary with frequency in the same manner as the first component $G_t$ of positive conductance, reflecting inherent loading effects in the input circuit of the stage.

From the above, it is seen that the proportioning of the reactance means of the first type, the condenser 17, is substantially determined by the product of the transconductance of the tube and at least a portion of the interelectrode capacitance between a predetermined pair of electrodes thereof divided by the amount of the second component which it is desired to utilize. Also, the proportioning of the reactance means of the second type, the inductor 18, is substantially determined by the value of the component of negative conductance divided by the product of the transconductance, the aforementioned portion of the interelectrode capacitance and a power of the mean frequency of the signal being translated through the tube 10.

The net input conductance of the stage may be expressed as:

$$G_T = G_C - G_L + G_t \quad (4)$$

The value of inductor 18 is selected so that the component of negative conductance is substantially equal to that resulting from the inherent loading effects. Where this operating condition is satisfied, the terms $G_L$ and $G_t$ of Equation 4 cancel one another, leaving only the term $G_C$. Accordingly, the input circuit experiences a substantially constant positive conductance of a preselected finite value at all frequencies within the operating range. Since the input conductance is constant over the range, and is connected in parallel with a circuit of constant capacitance, the input circuit time constant of damping is also constant and the stage is characterized by uniform band width.

Therefore, it is seen that the stage of Fig. 1, embodying the present invention, has the advantage of constant band width. It has the additional advantage that the band-width damping of the input selector 11, 14 is obtained by degenerative loading which provides the damping required without increasing the circuit noise to the extent that a physical damping resistor would change the noise level. Consequently, the stage has a very high signal-to-noise ratio, especially where a triode vacuum tube is employed as illustrated. At the resonant frequency of elements 17 and 18, the terms $G_C$ and $G_L$ of Equation 4 are equal and cancel one another. For this frequency, the net input positive conductance of the stage is equal to that caused by the inherent loading.

The following circuit constants and conditions may be useful in the operation of the described arrangement as a superheterodyne modulator of a television receiver. It will be understood, however, that the following enumeration is for purposes of illustration only and is not to be construed as a limitation upon the invention.

Tube 10, Type 6J6 double triode with both halves connected in parallel, transconductance reduced to 3000 micromhos for operation as a superheterodyne modulator
Condenser 14, 12 micromicrofarads
Condenser 17, 15 micromicrofarads
Condenser 21, 3 micromicrofarads
Inductor 18, 1 microhenry
Frequency range, 50–88 megacycles
Band width, 5 megacycles
Feed-back cancellation, 40 megacycles (resonant frequency of elements 17, 18)

While the arrangement of Fig. 1 is subject to a wide variety of applications, it is shown in the arrangement of Fig. 2 as the oscillator-modulator of a television receiver of the superheterodyne type. This receiver comprises a doublet antenna 25 coupled through condensers 26 and 27 to primary windings 28 and 29 of a transformer. The secondary windings 30 and 31 of the transformer have common terminals and are wound in opposite directions. To one of these terminals is connected a variable condenser 32 while to the other there is connected the combination of a resistor 12 and a condenser 13. A variable inductor 11 and a condenser 14 providing an input circuit to tube 10 in the manner of Fig. 1 are also connected to the high potential terminal of the combination of elements 12, 13 thereby to complete a selector coupling the antenna to tube 10 which is generally similar to the selector designated 9 in Fig. 9 of applicant's related Patent 2,196,881, issued April 9, 1940, and assigned by mesne assignments to the same assignee as the present invention. The modulator stage including tube 10 is substantially identical with that of Fig. 1 and corresponding components thereof are designated by the same reference characters. An output circuit of a heterodyning oscillator 35 is connected with the input circuit of the modulator through a condenser 41. Connected in cascade to the modulator, in the order named, are an intermediate-frequency amplifier 36 of one or more stages, a wave-signal detector 37, a video-frequency amplifier 38 of any desired number of stages, and an image-reproducing device 39 which may be of the cathode-ray type. It will be understood that suitable scanning apparatus and synchronizing apparatus therefor are included in the unit 39. The portions of the receiver described, except the modulator stage including tube 10, may be of well-known construction and design so that detailed descriptions thereof are deemed to be unnecessary.

Referring briefly to the operation of the receiving system, television signals intercepted by antenna 25 are selected and supplied to modulator 10 wherein they are converted to intermediate-frequency signals. The intermediate-frequency signals, in turn, are selectively amplified in intermediate-frequency amplifier 36 and delivered to detector 37. The modulation components of the received signal are derived by the detector 37 and after amplification in video-frequency amplifier 38 are applied in the usual manner to the brilliancy-control electrode of image-reproducing device 39. The intensity of the scanning beam of this device is thus modulated or controlled with the light modulation voltages impressed on the control element of the device in the usual manner. Synchronized scanning signals are generated in reproducing device 39, thereby to deflect the scanning ray in two directions normal to each other so as to trace a rectilinear scanning pattern and reconstruct the transmitted image. In this described operation of the composite receiver, the modulator including tube 10 functions as described in connection with Fig. 1. The receiver, while it may be conveniently tuned to any selected one of several transmitting stations, has a uniform band width for any operating condition of the system by virtue of the described construction of stage 10.

The present invention may also be employed in connection with pentode-tube or hexode-tube circuits, the former being represented in Fig. 3. In this arrangement tube 10′ is of the pentode type having a screen electrode, intermediate the first control electrode and anode as is well understood. The circuit is generally similar to that of Fig. 1 and corresponding components are identified by the same reference characters primed. However, in this modification, the feed-back circuit includes the condenser 21′, shown in broken-line construction since it may be comprised entirely of the interelectrode capacitance between the control and screen electrodes. It also includes the inductor 18′ and condenser 17′ serially connected between the screen electrode and cathode. The additional inductor 18″ constitutes a high-frequency choke. The output selector of the stage again consists of an inductor 19′ and a condenser 40. Elements 17′ and 21′ introduce a component of positive conductance while elements 18′ and 21′ introduce a component of negative conductance into the input circuit. Their action in this respect is generally similar to that of elements 17, 18 and 21 of the arrangement of Fig. 1.

As already stated, the signal-translating stages in accordance with this invention are suited for operation over a "wide range of high frequencies." The term "high frequencies" means frequencies at which such factors as transit-time and cathode-lead inductance effects are appreciable. By "wide range" is meant a range over which these effects undergo a substantial variation. For purposes of illustration only, a wide range may indicate a frequency ratio of at least 1.4 which corresponds to a variation of input conductance, in an uncompensated stage, of 2/1 over the range. By way of further illustration, high frequencies may be considered to be those at which the varying component of input conductance is at least half as great as the desired total conductance at some frequency in the range.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A signal-translating stage for operation over a wide range of high frequencies comprising: a vacuum tube having an anode, a cathode and a control electrode; a frequency-selective input circuit connected with said cathode and control electrode and primarily inductively tunable over said range; an output circuit for said stage including reactance means of a first type and reactance means of a second type serially connected to said anode and cathode; said signal-translating stage having incidental reactive characteristics with respect to said input circuit tending to develop thereacross a first component of positive conductance which varies with frequency over said range; and a feed-back circuit from said output to said input circuits including said reactance means of said first type and additional reactance means of the same type so proportional as to introduce into said input circuit a second component of positive conductance having a constant value over said range and including said reactance means of said second type coupled to said additional reactance means and being so proportioned as to introduce into said input circuit a component of negative conductance which is substantially equal to and varies with frequency in the same manner as said first component of positive conductance; said proportioning of said first-mentioned reactance means being substantially determined by the product of the transconductance of said tube and at least a portion of the interelectrode capacitance between a predetermined pair of electrodes thereof divided by the amount of said second component which it is desired to utilize and said proportioning of said second type of said reactance means being substantially determined by said component of said negative conductance divided by the product of said transconductance, said portion of said interelectrode capacitance and a power of said frequency; whereby said input circuit experiences a substantially constant finite value of positive conductance at all frequencies within said range.

2. A signal-translating stage for operation over a wide range of high frequencies comprising: a triode vacuum tube having an anode, a cathode and a control electrode; a frequency-selective input circuit connected with said cathode and control electrode and primarily inductively tunable over said range; an output circuit for said stage including a condenser and an inductor serially connected to said anode and cathode; said signal-translating stage having incidental reactive characteristics with respect to said input circuit tending to develop thereacross a first component of positive conductance which varies with frequency over said range; and a feed-back circuit from said output to said input circuits including said condenser in series relation with capacitive reactance means so proportional as to introduce into said input circuit a second component of positive conductance having a constant value over said range and including said inductor coupled to said capacitive reactance means and being so proportioned as to introduce into said input circuit a component of negative conductance which is substantially equal to and varies with frequency in the same manner as said first component of positive conductance; said proportioning of said condenser being substantially determined by the product of the transconductance of said tube tube and at least a portion of the interelectrode capacitance between a predetermined pair of electrodes thereof divided by the amount of said second component which it is desired to utilize and said proportioning of said inductor being substantially determined by said component of said negative conductance divided by the product of said transconductance, said portion of said interelectrode capacitance and a power of said frequency; whereby said input circuit experiences a substantially constant finite value of positive conductance at all frequencies within said range.

3. A signal-translating stage for operation over a wide range of high frequencies comprising: a triode vacuum tube having an anode, a cathode and a control electrode; a frequency-selective input circuit connected with said cathode and control electrode and primarily inductively tunable over said range; an output circuit for said stage including a condenser and an inductor serially connected to said anode and cathode; said signal-translating stage having incidental reactive characteristics with respect to said input circuit tending to develop thereacross a first component of positive conductance which varies with frequency over said range; and a feed-back circuit from said output to said input circuits comprising the interelectrode capacitance between said anode and said control electrode in series relation with said condenser so proportioned as to introduce into said input circuit a second component of positive conductance having a constant value over said range, and in series relation with said inductor being so proportioned as to introduce into said input circuit a component of negative conductance which is substantially equal to and varies with frequency in the same manner as said first component of positive conductance; said proportioning of said condenser being substantially determined by the product of the transconductance of said tube and at least a portion of said interelectrode capacitance divided by the amount of said second component which it is desired to utilize and said proportioning of said inductor being substantially determined by said component of said negative conductance divided by the product of said transconductance, said portion of said interelectrode capacitance and a power of said frequency; whereby said input circuit experiences a substantially constant finite value of positive conductance at all frequencies within said range.

4. A signal-translating stage for operation over a wide range of high frequencies comprising: a vacuum tube having an anode, a cathode, a control electrode and an intermediate electrode in the space between said anode and said control electrode; a frequency-selective input circuit connected with said cathode and control electrode and primarily inductively tunable over said range; an output circuit for said stage coupled to said anode and cathode; a circuit coupled to said cathode and intermediate electrode including reactance means of a first type serially connected with reactance means of a second type; said signal-translating stage having incidental reactive characteristics with respect to said input circuit tending to develop thereacross a first component of positive conductance which varies with frequency over said range; and a feed-back circuit including said reactance means of said first type in series relation with additional reactance means of the same type so proportioned as to introduce into said input circuit a second component of positive conductance having a constant value over said range and including said reactance means of said second type in series relation with said additional reactance means being so proportioned as to introduce into said input circuit a component of negative conductance which is substantially equal to and varies with frequency in the same manner as said first component of positive conductance; said proportioning of said first-mentioned reactance means being substantially determined by the product of the transconductance of said tube and at least a portion of the interelectrode capacitance between a predetermined pair of electrodes thereof divided by the amount of said second component which it is desired to utilize and said proportioning of said second type of said reactance means being substantially determined by said component of said negative conductance divided by the product of said transconductance, said portion of said interelectrode capacitance and a power of said frequency; whereby said input circuit experiences a substantially constant finite value of positive conductance at all frequencies within said range.

5. A signal-translating stage for operation over a wide range of high frequencies comprising: a vacuum tube having an anode, a cathode, a control electrode and an intermediate electrode in the space between said anode and said control electrode; a frequency-selective input circuit connected with said cathode and control electrode and primarily inductively tunable over said range; an output circuit for said stage coupled to said anode and cathode; a circuit coupled to said cathode and intermediate electrode including capacitive reactance means serially connected with inductive reactance means; said signal-translating stage having incidental reactive characteristics with respect to said input circuit tending to develop thereacross a first component of positive conductance which varies with frequency over said range; and a feed-back circuit comprising the interelectrode capacitance between said control and intermediate electrodes in series relation with said capacitive reactance means so proportioned as to introduce into said input circuit a second component of positive conductance having a constant value over said range and in series relation with said inductive reactance means being so proportioned as to introduce into said input circuit a component of negative conductance which is substantially equal to and varies with frequency in the same manner as said first component of positive conductance; said proportioning of said capacitative reactance means being substantially determined by the product of the transconductance of said tube and at least a portion of said interelectrode capacitance divided by the amount of said second component which it is desired to utilize and said proportioning of said inductive reactance means being substantially determined by said component of said negative conductance divided by the product of said transconductance, said portion of said interelectrode capacitance and a power of said frequency; whereby said input circuit experiences a substantially constant finite value of positive conductance at all frequencies within said range.

HAROLD A. WHEELER.

REFERENCES CITED

The following references are of record in the file of this patent:

UNITED STATES PATENTS

| Number | Name | Date |
|---|---|---|
| 1,945,244 | Whitaker | Jan. 30, 1934 |
| 2,067,536 | Klotz | Jan. 12, 1937 |
| 2,077,465 | Dalpayrat | Apr. 20, 1937 |
| 2,122,283 | Harris | June 28, 1938 |
| 2,170,645 | Peterson | Aug. 22, 1939 |
| 2,279,543 | Wheeler | Apr. 14, 1942 |
| 2,294,328 | Aldous | Aug. 25, 1942 |
| 2,430,835 | Strutt et al. | Nov. 11, 1947 |
| 2,486,986 | Sands | Nov. 1, 1949 |